US008574688B2

(12) United States Patent
Kilickiran et al.

(10) Patent No.: US 8,574,688 B2
(45) Date of Patent: Nov. 5, 2013

(54) BLUE PHASE LIQUID CRYSTAL COMPOSITION

(75) Inventors: Pinar Kilickiran, Stuttgart (DE); David Danner, Stuttgart (DE); Zakir Hussain, Stuttgart (DE); Nadine Hollfelder, Rutesheim (DE); Gabriele Nelles, Stuttgart (DE)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 13/053,627

(22) Filed: Mar. 22, 2011

(65) Prior Publication Data

US 2011/0240920 A1  Oct. 6, 2011

(30) Foreign Application Priority Data

Mar. 31, 2010  (EP) ..................... 10003616

(51) Int. Cl.
C09K 19/38 (2006.01)
C09K 19/20 (2006.01)
C09K 19/30 (2006.01)
C09K 19/12 (2006.01)
C09K 19/54 (2006.01)
G02F 1/133 (2006.01)

(52) U.S. Cl.
USPC ............... 428/1.1; 252/299.01; 252/299.5; 252/299.6; 252/299.63; 252/299.66; 252/299.67; 349/183

(58) Field of Classification Search
CPC ........... C09K 2019/0275; C09K 2019/0448; C09K 19/586
USPC ........... 428/1.1; 252/299.01, 299.6, 299.63, 252/299.66, 299.67, 299.5; 349/183
See application file for complete search history.

(56) References Cited

U.S. PATENT DOCUMENTS

| | | | | |
|---|---|---|---|---|
| 2005/0185131 | A1* | 8/2005 | Miyachi et al. | 349/167 |
| 2009/0322997 | A1* | 12/2009 | Kaihoko et al. | 349/117 |
| 2010/0103366 | A1* | 4/2010 | Farrand et al. | 349/183 |
| 2011/0240917 | A1* | 10/2011 | Kilickiran et al. | 252/299.6 |
| 2012/0138853 | A1* | 6/2012 | Kubota et al. | 252/299.64 |

FOREIGN PATENT DOCUMENTS

JP  2007308534  * 11/2007
WO  2005/080529  9/2005

OTHER PUBLICATIONS

English translation by computer for JP 2007-308534, http://www4.ipdl.inpit.go.jp/Tokujitu/PAJdetail.ipdl?N0000=60&N0120=01&N2001=2&N3001=2007-308534.*
S. Meiboom, et al. "Theory of the Blue Phase of Cholesteric Liquid Crystals", Physical Review Letters, vol. 46, No. 18, pp. 1216-1219. (May 4, 1981).

(Continued)

Primary Examiner — Shean C Wu
(74) Attorney, Agent, or Firm — Oblon, Spivak, McClelland, Maier & Neustadt, L.L.P.

(57) ABSTRACT

The present invention relates to a blue phase liquid crystal composition and to a method of stabilizing a blue phase state of a liquid crystal material. Moreover, the present invention also relates to a method of lowering the operating voltage of a liquid crystal material. Furthermore, the present invention relates to a blue phase liquid crystal material stabilized by the method according to the present invention or having an operating voltage that is lowered by the method according to the present invention. Furthermore, the present invention relates to a liquid crystal cell comprising a blue phase liquid crystal material and to a liquid crystal display comprising a blue phase liquid crystal material. The present invention also relates to a method of broadening the stability temperature range of a liquid crystal material in its blue phase state.

33 Claims, 7 Drawing Sheets

Voltage-transmission curves of stabilized BPs with or without LC side chains, with or without polar groups on LC side chains

(56) References Cited

OTHER PUBLICATIONS

Heinz-S Kitzerow "Blue Phases at Work!", Chem. Phys. Chem., 7, pp. 63-66. (2006).

H. Coles et al., "Liquid crystal 'blue phases' with a wide temperature range", Nature, vol. 436, No. 18, pp. 997-1000. (Aug. 2005).

Zhibing, G. et al. "Modeling of Blue Phase Liquid Crystal Displays", Journal of Display Technology, vol. 5, No. 7, pp. 250-256. (Jul. 2009).

T. Iwata, et al. "Control of Cross-Linking Polymerization Kinetics and Polymer Aggregated Structure in Polymer-Stabilzed Liquid Crystalline Blue Phases", Macromolecules, 42, pp. 2002-2008. (2009).

H. Kikuchi, et al. "Polymer-Stabilized Liquid Crystal Blue Phases", Nature Materials, vol. 1, pp. 64-68. (Sep. 2002).

European Search Report issued Jan. 21, 2013, in connection with corresponding European Patent Application No. 11 00 2228, filed Mar. 17, 2011.

T. Iwata, et al. "A Method for Enlarging the Kerr Constant of Polymer-Stabilised Blue Phases", Liquid Crystals: An International Journal of Science and Technology, Taylor & Francis, GB, vol. 36, No. 9, pp. 947-951. (Sep. 1, 2009).

\* cited by examiner

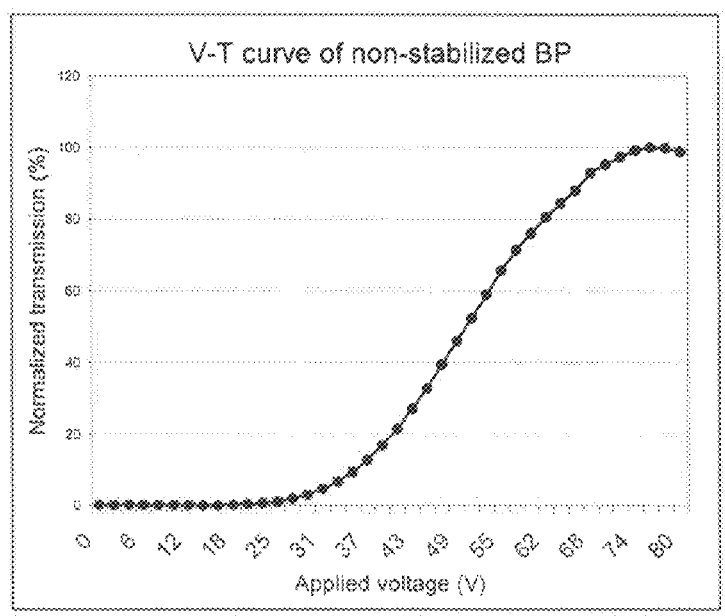
Figure 1. Voltage-transmission curve of non-stabilized BP with 80V operating voltage

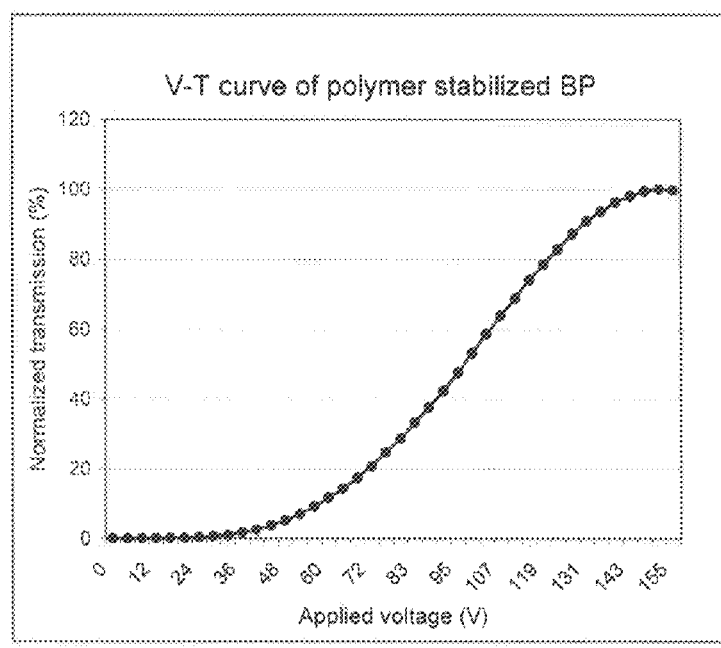
Figure 2. Voltage-transmission curve of stabilized BP with over 140V operating voltage

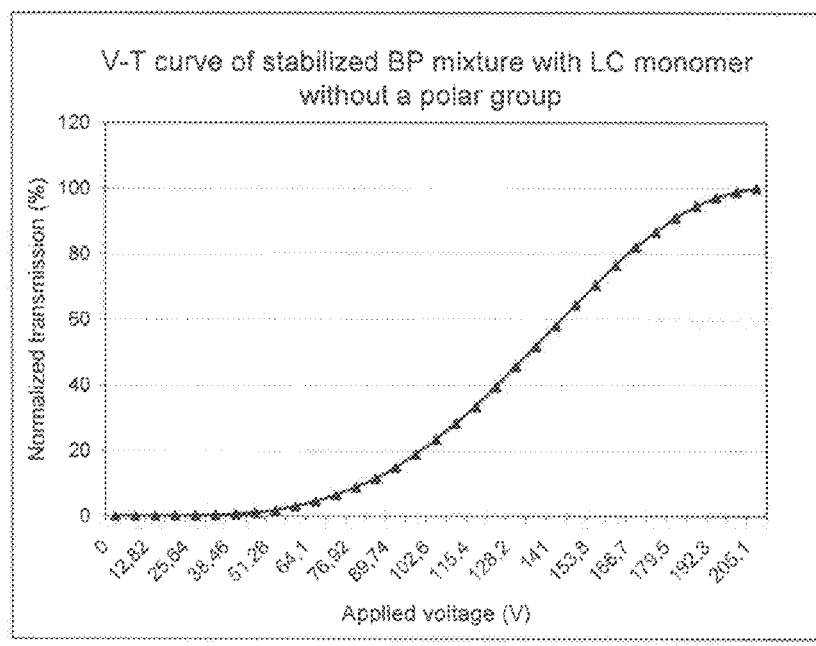
Figure 3. Voltage-transmission curve of stabilized BP. This mixture is stabilized using a LC monomer (ULC) which does not have a polar group that can react fast to an applied electric field

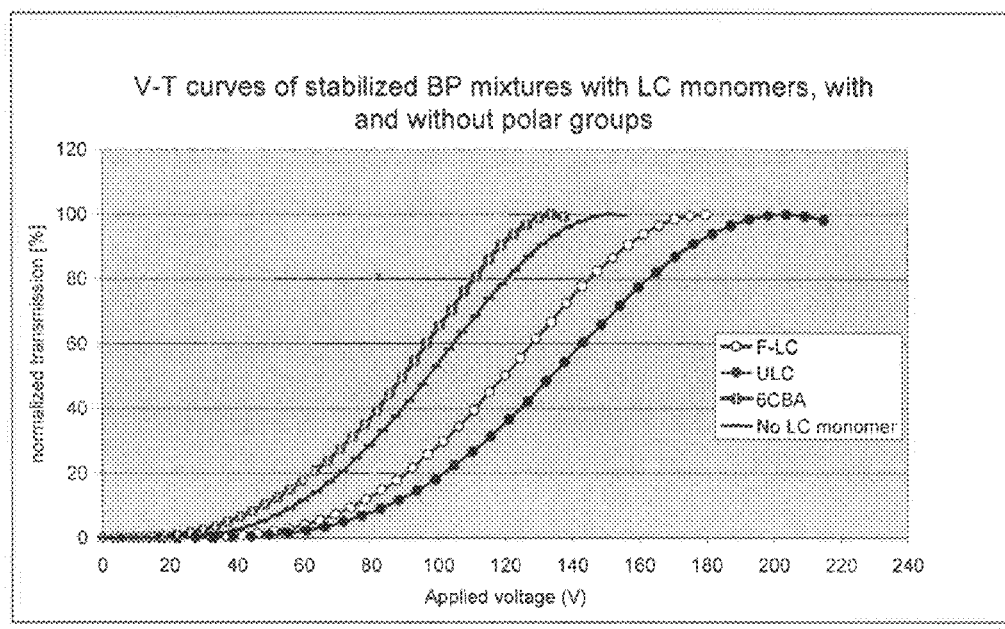
Figure 4. Voltage-transmission curves of stabilized BPs with or without LC side chains, with or without polar groups on LC side chains

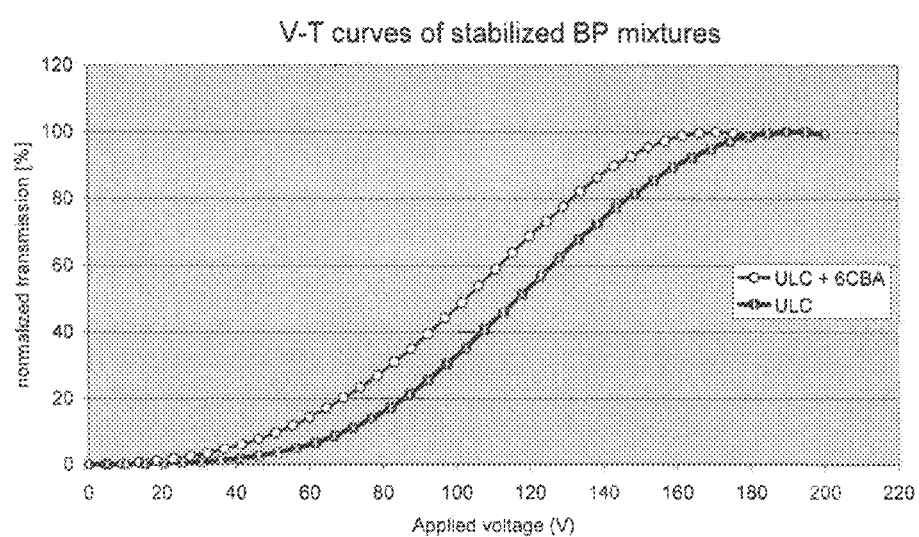
Figure 5. Voltage transmission curves of stabilized BP mixtures a) using ULC together with 6CBA, b) using ULC alone.

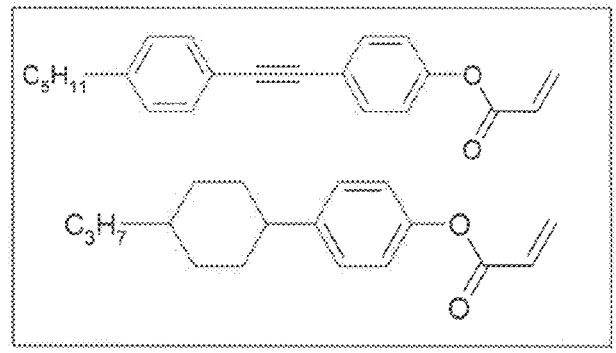
Figure 6. UV curable LC monomer mixtureULC (ULC-001-K1)
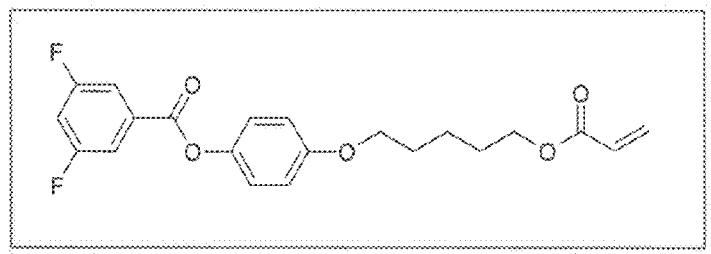
Figure 7. UV curable LC monomer F-LC
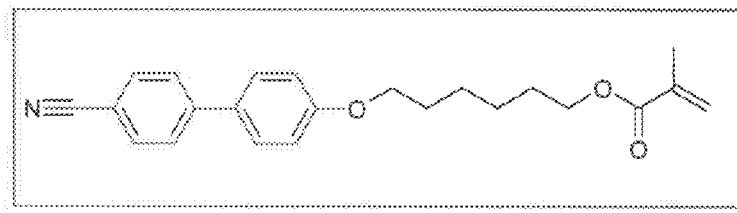
Figure 8. UV curable LC monomer 6CBA

BLUE PHASE LIQUID CRYSTAL COMPOSITION

The present invention relates to a blue phase liquid crystal composition and to a method of stabilizing a blue phase state of a liquid crystal material. Moreover, the present invention also relates to a method of lowering the operating voltage of a liquid crystal material. Furthermore, the present invention relates to a blue phase liquid crystal material stabilized by the method according to the present invention or having an operating voltage that is lowered by the method according to the present invention. Furthermore, the present invention relates to a liquid crystal cell comprising a blue phase liquid crystal material and to a liquid crystal display comprising a blue phase liquid crystal material. The present invention also relates to a method of broadening the stability temperature range of a liquid crystal material in its blue phase state.

Liquid crystalline blue phases are self-assembled cubic structures which are composed of helically double twisted cylinders. This type of structure is limited to a very narrow temperature range of approximately 1-2° C. To make use of such liquid crystalline blue phases in display applications, the blue phase (BP) must be brought into a state where it is stable over a larger temperature range. In recent years, based on the work of Kikuchi et al., ways have been found to extend the temperature range of blue phase liquid crystals to more than 60° C., wherein the blue phase is stabilized by the help of a polymer network. Coles et al. developed novel bimesogenic materials which yielded temperature ranges of approximately 50° C. over which the blue phase state of a liquid crystal material exists.

A liquid crystalline blue phase is an optically isotropic phase which, upon application of an electric field and based on the Kerr effect, becomes birefringent, and, due to the refractive index distribution of the liquid crystal, turns into an optically anisotropic state which is unlike other liquid crystal phases which are switching from one anisotropic state to another. If the blue phase is brought between two crossed polarizers, the transmittance increases with increase of the voltage. This operation requires application of a considerable voltage as it links up to the induced birefringence which itself is highly dependent on the Kerr constant of the liquid crystal material and also on the strength of the electric field. Although the broadening of the stability temperature range of a blue phase liquid crystal material represents an advancement, there are still drawbacks associated with blue phase liquid crystal materials, such as the high operating voltage which needs to be applied to make the blue phase switch from a dark to a bright state, a relatively low transmittance and the fact that the temperature ranges are still not wide enough for practical applications in displays. Different approaches have been taken to improve the above-mentioned aspects, such as for example by means of an optimization of the electrode structure, a tuning of the liquid crystal and chiral materials, an improvement of the polymer network by using multifunctional monomers (see also reference 1-6).

1. H. Kikuchi, M. Yokota, Y. Hisakado, H. Yang, T. Kajiyama; Nature materials, Vol. 1, 64-68, 2002.
2. H. Coles, M. Pivnenko, Nature, 436, 18, 997-1000, 2005.
3. T. Iwata, K. Suzuki, N. Amaya, H. Higuchi, H. Masunaga, S. Sasaki, H. Kikuchi, Macromolecules, 42, 2002-2008, 2009.
4. Z. Ge, L. Rao, S. Gauza, S.-T. Wu, J. Display Technol., Vol. 5, No. 7, 250-256, 2009
5. H.-S. Kitzerow, Chem Phys Chem 7, 63-66, 2006
6. S. Meiboom, J. P. Sethna, W. P. Anderson, W. F. Brinkman, Phys. Rev. Lett., Vol. 46, 1216-1219, 1981

Current electronic device display technologies require displays with high brightness and contrast, low power consumption and very fast response times for application fields such as three-dimensional displays or field sequential displays. Incorporating liquid crystalline blue phase materials into displays offers the potential to meet several of these requirements, but still the issues of stability of these blue phases and operating voltage of such blue phase liquid crystal materials need to be resolved. Accordingly, it was an object of the present invention to provide for means to increase the stability of blue phase liquid crystal materials. It was also an object of the present invention to provide for means to lower the operating voltage of blue phase liquid crystal materials.

All these objects are solved by a liquid crystal composition comprising:

a liquid crystal material capable of forming a blue phase, a first polymerizable monomer for crosslinking, said first polymerizable monomer comprising a monomer moiety, a second polymerizable monomer comprising a monomer moiety, wherein at least one of said first and said second polymerizable monomers has a liquid crystal side chain, and wherein, if said first polymerizable monomer is 2-methyl-1,4-phenylene bis{4-[3-(acryloyloxy)propyloxy]benzoate}, said first polymerizable monomer for crosslinking is present in said composition at a concentration of 2.8 mol % to 10 mol %, preferably from 2.9 mol % to 5 mol %.

In one embodiment, said first polymerizable monomer does not have a liquid crystal side chain and said second polymerizable monomer has a liquid crystal side chain.

In one embodiment, in said first and/or second polymerizable monomer, said liquid crystal side chain, if present, is directly attached to said monomer moiety or is attached to said monomer moiety via a spacer group having 1-20 C-atoms in lengths, preferably 2-10 C-atoms, more preferably 4-8 C-atoms.

In one embodiment, said liquid crystal side chain has at least one polar group attached, such as —Cl, —F, —Br, —I, —OH, —OR, —CF$_3$, —OCF$_3$, —CN, —NO$_2$, —SF$_3$, —OSF$_3$, —COOR, OR, —SCN, —NCS, wherein R is an alkyl chain $C_nH_{2n+1}$, wherein n=1 to 22.

In one embodiment, said second polymerizable monomer is an acrylate monomer or a mixture of acrylate monomers.

In one embodiment, said second polymerizable monomer is selected from the group comprising

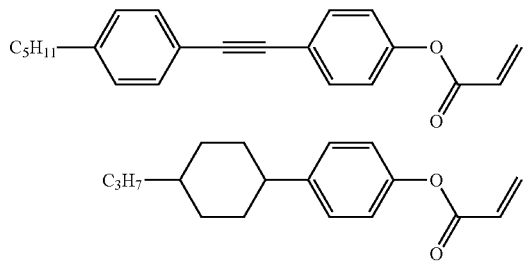

namely a mixture of Acrylic acid 4-(4-pentyl-phenylethynyl)-phenyl ester and Acrylic acid 4-(4-propyl-cyclohexylethynyl)-phenyl ester,

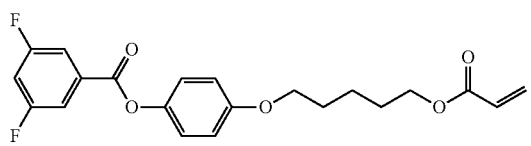

namely 3,5-Difluoro-benzoic acid 4-(5-acryloyloxy-pentyloxy)-phenyl ester,

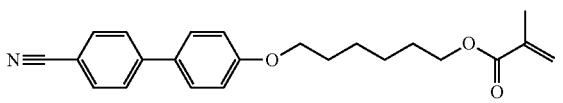

namely 2-Methyl-acrylic acid 5-(4'-cyano-biphenyl-4-yloxy)-pentyl ester,

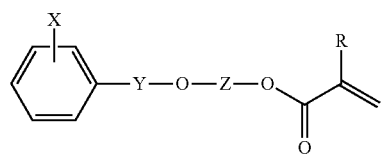

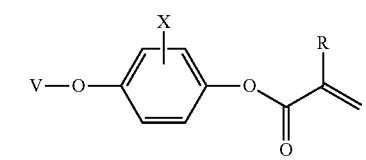

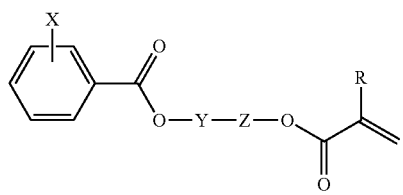

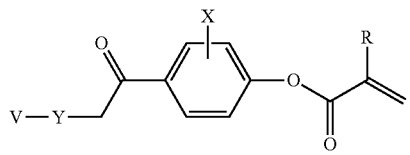

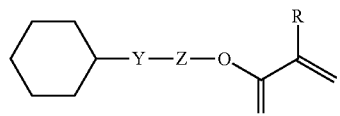

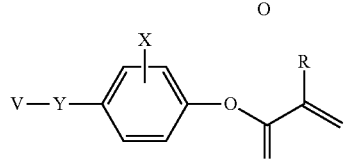

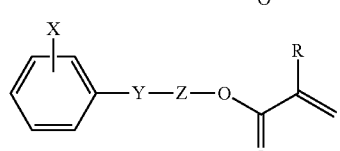

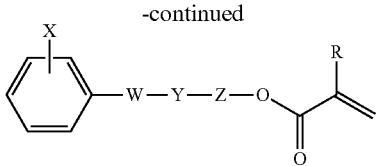

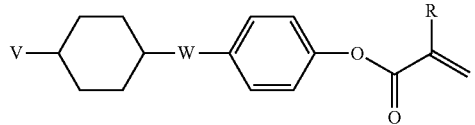

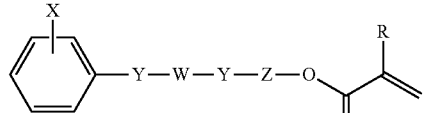

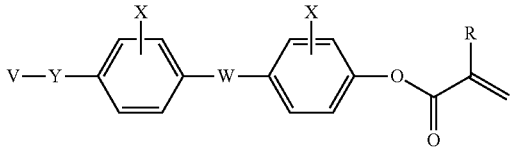

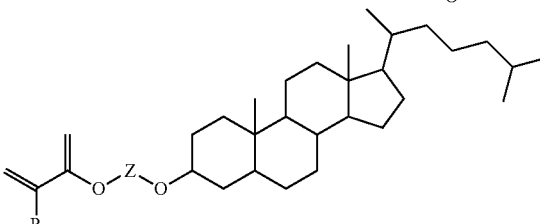

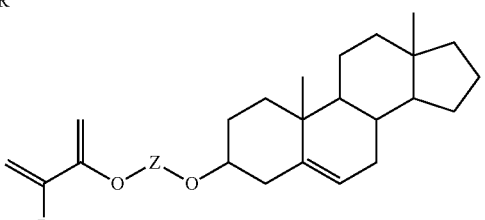

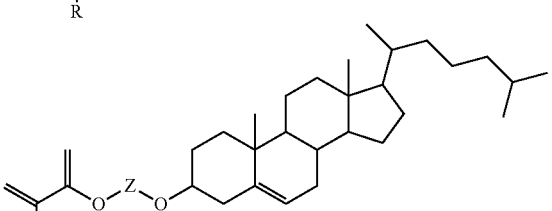

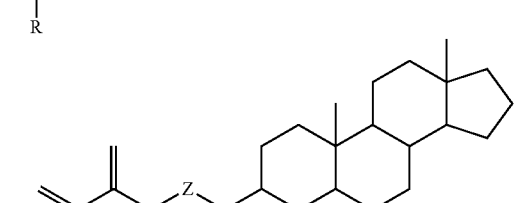

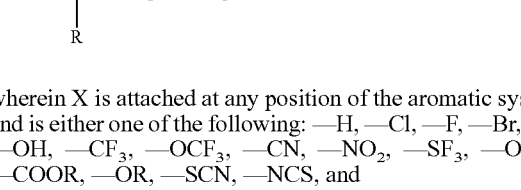

wherein X is attached at any position of the aromatic system and is either one of the following: —H, —Cl, —F, —Br, —I, —OH, —CF$_3$, —OCF$_3$, —CN, —NO$_2$, —SF$_3$, —OSF$_3$, —COOR, —OR, —SCN, —NCS, and wherein Z is (CH$_2$)$_n$ where n is 0 to 22, preferably 0 to 10, and wherein W is —C≡C—, —'RC=CR'—, O, S, NR, —COO, —OCO—, R' being C$_m$H$_{2m}$ where m is 0 to 22, preferably 0 to 10, R being H or C$_n$H$_{2n+1}$, where n is 0 to 22, preferably 0 to 10, wherein Y is one of the following: phenyl, biphenyl, triphenyl, one or more Cyclohexyl, each of which is optionally and independently substituted by one or more of the following substituents at any position: —H, —Cl, —F, —Br, —I, —OH, —OCH$_3$—CF$_3$, —OCF$_3$, —CN, —NO$_2$, —SF$_3$, —OSF$_3$,—COOR wherein R is —(CH$_2$)$_n$CH$_3$ where n is 0 to 22, preferably 0 to 10, and wherein V is —(CH$_2$)$_n$CH$_3$ where n is 0 to 22, preferably 0 to 10, and wherein R is H or C$_n$H$_{2n+1}$ where n is 0 to 22, preferably 0 to 10.

In one embodiment, said liquid crystal material capable of forming a blue phase is a mixture of liquid crystalline compounds.

In one embodiment, said liquid crystal composition additionally comprises a photo initiator, such as 2,2-dimethoxy-2-phenyl acetophenone (DMPAP).

In one embodiment, said liquid crystal material capable of forming a blue phase is a mixture comprising the following: a nematic mixture, such as JC-1041XX®, a further liquid crystalline compound, such as 4-cyano 4'-pentyl biphenyl (5CB®), and a chiral dopant, such as ZLI-4572®

In one embodiment, said first polymerizable monomer for crosslinking is selected from diacrylate monomers, such as RM257®, or other monomers with polymerizable units at both ends of the monomer molecule such as divinyl monomers.

The objects of the present invention are also solved by a method of stabilising a blue phase state of a liquid crystal material capable of forming a blue phase and/or of broadening the temperature range over which a blue phase state of a liquid crystal material capable of forming a blue phase is stable, said method comprising:

adding to said liquid crystal material capable of forming a blue phase, a first polymerizable monomer for crosslinking, said first polymerizable monomer comprising a monomer moiety, and a second polymerizable monomer comprising a monomer moiety, wherein at least one of said first and said second polymerizable monomers has a liquid crystal side chain, and wherein, if said first polymerizable monomer is 2-methyl-1,4-phenylene bis{4-[3-(acryloyloxy)propyloxy]benzoate}, said first polymerizable monomer for crosslinking is present in said composition at a concentration of 2.8 mol % to 10 mol %, preferably from 2.9 mol % to 5 mol %, said polymerizable monomers and said liquid crystal material capable of forming a blue phase being as defined above, inducing polymerisation of said polymerizable monomers, under conditions where a blue phase state of said liquid crystal material exists.

The objects of the present invention are also solved by a method of lowering the operating voltage of a liquid crystal material capable of forming a blue phase, said method comprising:

adding to said liquid crystal material capable of forming a blue phase, a first polymerizable monomer for crosslinking, said first polymerizable monomer comprising a monomer moiety, and a second polymerizable monomer comprising a monomer moiety, wherein at least one of said first and said second polymerizable monomers has a liquid crystal side chain, and wherein, if said first polymerizable monomer is 2-methyl-1,4-phenylene bis{4-[3-(acryloyloxy)propyloxy]benzoate}, said first polymerizable monomer for crosslinking is present in said composition at a concentration of 2.8 mol % to 10 mol %, preferably from 2.9 mol % to 5 mol %, wherein said liquid crystal side chain is attached to said monomer moiety directly or via a spacer group having 1-20 C-atoms in length, preferably 2-10 C-atoms, more preferably 4-8 C-atoms, and/or wherein said liquid crystal side chain has at least one polar group attached, such as —Cl, —F, —Br, —I, —OH, —OR, —CF$_3$, —OCF$_3$, —CN, —NO$_2$, —SF$_3$, —OSF$_3$, —COOR, OR, R being an alkylchain C$_n$H$_{2n+1}$ where n=1 to 22, —SCN, —NCS, said polymerizable monomers and said liquid crystal material capable of forming a blue phase being as defined above, inducing polymerisation of said polymerizable monomers, under conditions where a blue phase state of said liquid crystal material exists.

The objects of the present invention are also solved by a blue phase liquid crystal composition stabilized by the method according to the present invention or having an operating voltage that is lowered by the method according to the present invention.

The objects of the present invention are also solved by a blue phase liquid crystal composition having a stability temperature range which has been broadened by the method according to the present invention.

The objects of the present invention are also solved by a liquid crystal cell comprising a blue phase liquid crystal composition according to the present invention.

The objects of the present invention are also solved by a liquid crystal display comprising a blue phase liquid crystal composition or a liquid crystal cell according to the present invention.

In one embodiment, a liquid crystal composition in accordance with the present invention has the following concentrations:

40-48 mol % liquid crystal material capable of forming a blue phase, 40-48 mol % of a further liquid crystalline compound, 2.8-20 mol % of a first polymerizable monomer for crosslinking, 2-20 mol % of a second polymerizable monomer with the proviso that at least one of said first and second polymerizable monomers has a liquid crystal side chain, said first and second polymerizable monomer being as defined above.

In one embodiment, the liquid crystal composition according to the present invention comprises 40-45 mol % of said liquid crystal material capable of forming a blue phase, 40-45 mol % of a further liquid crystalline compound, 2.8-10 mol % of said first polymerizable monomer for crosslinking, and 3-10 mol % of said second polymerizable monomer.

It should be understood that in all of the above recited compositions, the total should make up 100 mol %. If the afore-mentioned constituents make up less than 100 mol %, there may, of course, also be additional components present, such as one or several chiral dopant materials, preferably in the range of from 3 to 6 mol %, and photo initiators, preferably in the range of from 0.1 to 2 mol %.

As used herein, the term "blue phase" is meant to refer to a state of a liquid crystal material or composition, wherein double twist structures occur over extended dimensions. In one embodiment, such blue phase state is a self-assembled three-dimensional cubic defect structure of a liquid crystal material/composition.

A liquid crystal material capable of forming a blue phase, as used herein, is a liquid crystal material which, under defined conditions, may form such blue phase. Typically, this is a defined temperature range. A person skilled in the art will be able to determine and identify liquid crystal materials capable of forming a blue phase. In one embodiment, such liquid crystal material is a positive type nematic liquid crystal material which additionally includes a chiral dopant material. Such liquid crystal material may also be a mixture of various liquid crystal compounds. Blue phase liquid crystal materials are also commercially available from a variety of sources. A commercially available example of a blue phase liquid crystal material is JC-1041xx®, which is a mixture of various positive type nematic liquid crystal compounds. An example of a chiral dopant material is ZLI-4572®.

In accordance with the present invention, the liquid crystal material capable of forming a blue phase is a mixture of liquid crystalline compounds and one or more chiral materials. A person skilled in the art will be able to determine whether or not a liquid crystal mixture forms a blue phase, by simply raising the temperature of the liquid crystal material and subsequently lowering it again under defined conditions and measuring or observing the light transmission during the phase transition from the isotropic phase to a chiral nematic phase or vice versa.

The term "5CB®" refers to 4-cyano 4'-pentyl biphenyl; the term "6CBA®" refers to 6-(4'-cyanobiphenyl-4-yloxy)hexyl acrylate.

The present inventors have surprisingly found that, by including in the liquid crystal material mixture which is capable of forming a blue phase at least one polymerizable monomer which has a liquid crystal side chain, it is possible to stabilize the blue phase state of the liquid crystal material, if the polymerizable monomer having such liquid crystal side chain is polymerized while the liquid crystal material is in a blue phase state. In accordance with one embodiment of the invention, a liquid crystal composition comprises:

a liquid crystal material capable of forming a blue phase,
a first polymerizable monomer for crosslinking, said first polymerizable monomer comprising a monomer moiety,
a second polymerizable monomer comprising a monomer moiety,
wherein at least one of said first and said second polymerizable monomers has a liquid crystal side chain, and wherein, if said first polymerizable monomer is 2-methyl-1,4-phenylene bis{4-[3-(acryloyloxy)propyloxy] benzoate}, said first polymerizable monomer for crosslinking is present in said composition at a concentration of 2.8 mol % to 10 mol %, preferably from 2.9 mol % to 5 mol %.

Without wishing to be bound by any theory, the present inventors believe that the liquid crystal side chains of the polymerizable monomers are believed to interact with the blue phase liquid crystal material and become involved in the organization of the blue phase state. Depending on the nature of the side chain, the stability of the blue phase state is increased by broadening the temperature range of stability of such blue phase, and/or the operating voltage of the blue phase state is lowered. First of all, by simply including such polymerizable monomer having a liquid crystal side chain, the stability of the blue phase is increased in that the temperature stability range is broadened. Secondly, if the liquid crystal side chain has one or several polar groups attached, such as halogens, e.g. F, or CN, or the liquid crystal side chain is attached to the monomer moiety by means of a spacer which exceeds 1 C-atoms in length, the operating voltage of the blue phase state becomes lowered.

In accordance with the present invention, in one embodiment, the liquid crystal composition comprises a liquid crystal material which is capable of forming a blue phase in the presence of one or more chiral materials, and additionally, the liquid crystal composition comprises at least one polymerizable monomer which comprises a monomer moiety and has a liquid crystal side chain. The liquid crystal material which is capable of forming a blue phase itself additionally comprises a polymerizable monomer for crosslinking with or without LC side chain which may also be induced to polymerize to thereby stabilize the liquid crystal composition. Altogether the liquid crystal composition according to the present invention therefore comprises at least two different monomers, one for crosslinking/polymerization and one for endcapping/polymerization, and at least one of them has a liquid crystal side chain. As a result of polymerization, the liquid crystal side chain interacts with the liquid crystal material capable of forming a blue phase and thereby stabilizes it and/or lowers the operating voltage of the blue phase.

The terms "crosslinking monomer" and "polymerizable monomer for crosslinking", as used herein, are meant to refer to a monomer which has at least two chemical functionalities which allow this monomer to crosslink in a polymerization reaction. Examples for such "crosslinking monomers" are diacrylate monomers, divinyl monomers, etc. A specific commercially available example of a diacrylate monomer is RM257®.

In the following, reference is made to the figures, wherein

FIG. 1 shows the voltage-transmission curve of a typical standard BP (blue phase) liquid crystal mixture (see Kikuchi et al., see above), which has a temperature stability range of only 2 degrees. The mixture requires an operating voltage of 80 V;

FIG. 2 shows the voltage transmission curve of the same blue phase liquid crystal mixture, when stabilized by a polymer, wherein the stability temperature range has been extended to a range from −30° C. to +50° C.; however, the operating voltage has also dramatically increased and becomes more than 140 V. The temperature stability range is monitored by observing the color change using an optical microscope when the temperature is increased or decreased.

FIG. 3 shows a voltage-transmission curve of a blue phase liquid crystal mixture which has been stabilized by polymerization of an acrylate monomer, and by polymerization of a monomer having a liquid crystalline side chain without a polar group attached (in this specific example it is the liquid crystal monomer mixture ULC which is composed of acrylic acid 4-(4-pentyl-phenylethynyl)-phenyl ester and acrylic acid 4-(4-propyl-cyclohexylethynyl)-phenyl ester.

The structure thereof is also given in FIG. 6.

FIG. 4 shows the voltage-transmission curve of stabilized blue phase liquid crystal mixtures wherein various monomers having liquid crystal side chains have been polymerized and compared to a blue phase liquid crystal mixture wherein monomers have been polymerized but which have no liquid crystal side chains ("no LC-monomer"). The monomers used are F-LC, i.e. (3,5-Difluoro-benzoic acid 4-(5-acryloyloxy-pentyloxy)-phenyl ester), ULC (mixture of acrylic acid 4-(4-pentyl-phenylethynyl)-phenyl ester and acrylic acid 4-(4-propyl-cyclohexylethynyl)-phenyl ester), 6CBA (2-Methyl-acrylic acid 5-(4'-cyano-biphenyl-4-yloxy)-pentyl ester), and acrylate monomers having no liquid crystal side chains ("no LC-monomer");

FIG. 5 shows the voltage transmission curve of a stabilized blue phase liquid crystal mixture including a mixture of monomers ULC and 6CBA, and including a monomer of ULC only;

FIGS. 6-8 show the chemical structures of ULC, F-LC and 6CBA, respectively;

Figure 9:
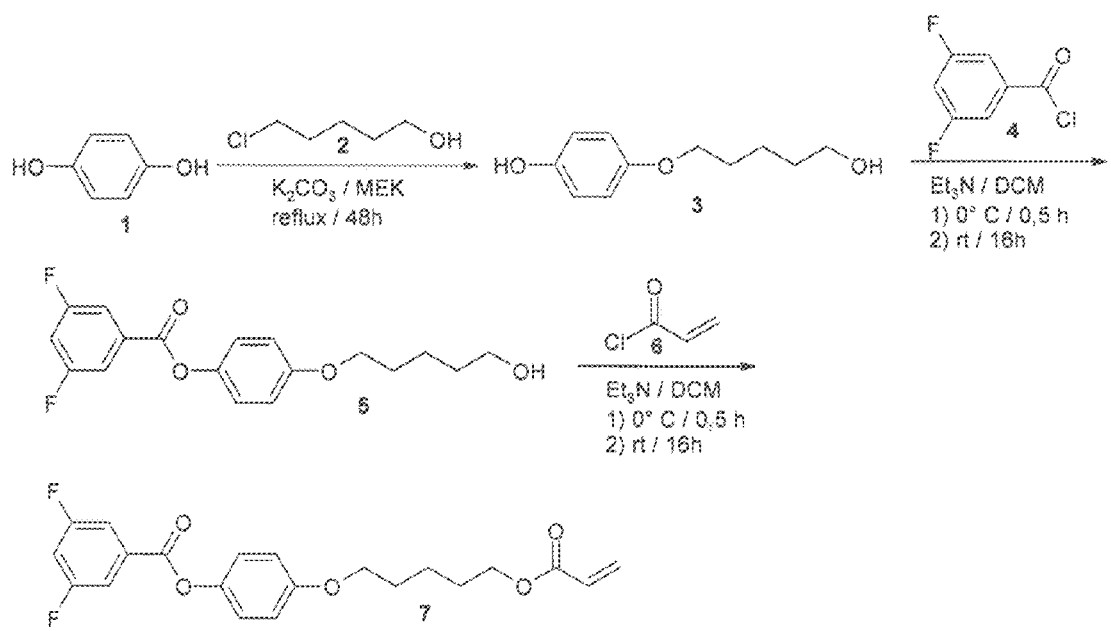
FIG. 9 shows a way of synthesis of F-LC.

As used herein, the term "stabilized blue phase liquid crystal mixture" refers to a liquid crystal mixture in which at least one polymerizable monomer has been induced to polymerize to form a polymer network. Such stabilization is also possible with monomers having no liquid crystalline side chain. However, in accordance with the present invention, at least one monomer is used which is polymerizable and which has a liquid crystalline side chain. This monomer having a liquid crystalline side chain may be used alone or in addition to the previously mentioned monomers for formation of the polymer network for stabilization. Use of such monomer having a liquid crystal side chain is believed to broaden the stability range of the blue phase. Additionally, if the liquid crystal side chain has polar groups attached and/or the liquid crystal side chain is attached to the monomer moiety via a spacer group which has 1-20 C-atoms in length, the operating voltage of the blue phase liquid crystal material is lowered. As used herein, the term "operating voltage of a blue phase liquid crystal material" refers to the operating voltage that is necessary to achieve transmission from the optically isotropic state to the optically anisotropic state, if such blue phase liquid crystal material is included in a liquid crystal cell. As used herein, the term "LC cell" or "liquid crystal cell" is meant to refer to both a liquid crystal display and/or a liquid crystal test display.

The presence of one or several polar groups at the liquid crystal side chain and/or the length of the spacer group have an influence on the operating voltage. The more polar the side chain is, the lower the operating voltage becomes.

Polymerisation of the various monomers mentioned above can be achieved by conventional means, such as heating or irradiation, wherein, in preferred embodiments, polymerisation is initiated and achieved by irradiation using UV-radiation. A person skilled in the art is familiar with such polymerisation methods.

Moreover, reference is made to the following examples which are given to illustrate, not to limit the present invention.

EXAMPLES

Example 1

A typical procedure to prepare a blue phase test display panel using an acryl monomer with LC side chains is as such: A cell comprising of two stuck-together glass substrates with ITO electrodes, where at least one substrate is coated with interdigitated ITO-electrode, is filled with the HPLC mixture by capillary filling. The HPLC mixture (=liquid crystal composition capable of forming a blue phase) contains one or several liquid crystals, chiral dopant, photo initiator, one or more monomers for cross-linking and one or more for end-capping. Either one or both of the monomers in accordance with the present invention, is a liquid crystalline LC monomer.

The cell is heated with heating stage (Linkam LTS350) to isotropic phase and cooled down afterwards with help of liquid nitrogen (Linkam LNP) at a rate of 0.1° C./minute. During the cooling process blue phase is detected. The device is kept at the specific temperature where BP occurs and UV light of 1.5 mW/cm$^2$ (Hamamatsu) is shone onto the cell for 20 minutes. The cell is allowed to cool down to room temperature and is than ready for measurement of BP temperature range and electro optical response properties.

Example for HPLC Mixture:

An exemplary mixture used for stabilization of BP with wide temperature range contained the following:
43 mol % LC-mixture JC-1041XX, 43 mol % LC 5CB, 4.50 mol % Chiral Dopant ZLI-4572, 3 mol % reactive monomer RM257, 6.29 mol % acrylic LC ULC-001-K1 (LC monomer for end-capping), 0.50 mol % Photoinitiator DMPAP.

This mentioned mixture is compared with a standard mixture. The difference between the two mixtures is the LC monomer used by the present invention and the EHA monomer of the standard mixture, as well as the minimum concentration at which said monomer for crosslinking is present. The composition of the standard mixture is as such:
43 mol % LC-mixture JC-1041XX, 43 mol % LC 5CB, 4.50 mol % Chiral Dopant ZLI-4572, 2.9 mol % reactive monomer RM257, 4.1 mol % acrylic EHA (monomer for end-capping), 0.50 mol % Photoinitiator DMPAP.

Using the above mentioned mixture with LC monomer, before UV curing the BP mixture showed a stable temperature range between 59-61° C., whereas the stable temperature range of the literature mixture was only between 46-49° C. These results show that at the initial mixture there was a much stronger interaction between LC monomer and the HPLC mixture in comparison to the non-LC monomer and the HPLC mixture.

After both of the HPLCs were stabilized by UV curing the final stability temperature that was achieved with the LC-monomer mixture was >0° C.-60° C. and the same with non-LC monomer was >0° C.-50° C. These results show very successfully that the LC side chains of the newly formed polymer were still in interaction with the HPLC even after polymerization.

The switching behaviour of the above mentioned LC-polymer stabilized BP is shown in FIG. 3 where still high operating voltage had to be applied. The reason for the higher voltage requirement of this mixture made from LC monomer ULC-001-K1 can easily be attributed to the fact that the tested LC side chain did not have any polar groups, which means the LC chains could not respond to the applied electric field fast enough. To solve this issue, the inventors used other LC monomers, one of which was synthesized by the inventors (please see synthesis part) and one of which was commercially available. These new materials have polar groups such as fluorine (F-LC) or cyano (6CBA) on the LC side chains. Using these new monomers the inventors could show that when polar groups are attached to the LC side chains then the necessary operating voltages reduce, FIG. 4.

The inventors also used a mixture of ULC and 6CBA monomers together. As can be followed from FIG. 5, the required operating voltage is once again reduced by the help of 6CBA. This mixture was stable still up to 58.5° C.

The structures of the LC monomers ULC (ULC-001-K1), F-LC and 6CBA are given in FIGS. 6-8.

Example 2

Synthesis of F-LC (7)

In the first reaction Hydroquinone 1 (12 mmol) was coupled with 5-chloro-1-pentanol 2 (8 mmol) by refluxing in methylethylketone (30 ml) with potassium carbonate (12 mmol) for 48 hours. After the reaction was finished, the reaction mixture was filtered to remove potassium carbonate and solvent was removed under reduced pressure. Purification was done by eluting over silica gel column with ethyl acetate/n-hexane (1:1) to receive 4-(5-hydroxy-pentyloxy) phenol 3 in 30% yield.

Following reaction was carried out adding 3,5-difluorobenzoyl chloride 4 (0.5 mmol) dropwise to a mixture of 4-(5-hydroxy-pentyloxy)-phenol 3 (0.76 mmol) and triethylamine (200 μl) in dichloromethane (anhydrous; 10 ml) on an ice bath. After the mixture was stirred for 30 minutes, the ice bath was removed and reaction-mixture was stirred for further 16 h at room temperature. After reaction was finished, solvent was removed under reduced pressure and the crude mixture was purified over silica gel column with ethyl acetate/n-hexane (1:1) to receive 4'-(5-Hydroxy-pentyloxy)-phenyl-3,5-difluoro benzoate 5 in 75% yield.

For the final reaction step acryloyl chloride 6 (0.45 mmol) was added dropwise to a mixture of 4-(5-hydroxy-pentyloxy)-phenyl-3,5-difluoro benzoate 5 (0.36 mmol) and triethylamine (150 μl) in dichloromethane (anhydrous; 10 ml) on an ice bath. After stirring for 30 minutes the ice bath was removed and the mixture was stirred for 16 hours at room temperature. Water was then added to the mixture and extraction was done with dichloromethane. The organic layer was washed with saturated sodium bicarbonate solution and with saturated sodium chloride solution and dried over magnesium sulfate. Solvent was removed under reduced pressure and purification was done by silica gel column with diethyl ether/pentane (1:4) to receive final product (3,5-Difluoro-benzoic acid 4-(5-acryloyloxy-pentyloxy)-phenyl ester) 7 in 75% yield.

In accordance with the present invention, polymerizable monomers having liquid crystal side chain are used to extend and broaden the temperature stability range of blue phase liquid crystals and to lower the operating voltages thereof. In accordance with the present invention, the liquid crystal side chains of these monomers may feature none, one or more polar groups attached, and/or the liquid crystal side chains may be attached to the monomer moiety via a spacer group, which also reduces the operating voltage. In accordance with the present invention, the polymerizable monomers having liquid crystal side chains have reactive units which contribute to the formation of the polymer network which is important for stabilisation of the blue phase. Secondly, the liquid crystal side chain interacts with the blue phase system and extends the temperature range of the blue phase and lowers the operating voltage of the blue phase liquid crystal mixture, when incorporated into a liquid crystal cell.

The features of the present invention disclosed in the specification, the claims and/or in the accompanying drawings, may, both separately, and in any combination thereof, be material for realizing the invention in various forms thereof.

The invention claimed is:
1. A liquid crystal composition comprising:
a liquid crystal material capable of forming a blue phase,
a first polymerizable monomer for crosslinking, and
a second polymerizable monomer,
wherein at least one of said first and said second polymerizable monomers has a liquid crystal side chain, with the proviso that when the first polymerizable monomer is 2-methyl-1,4-phenylene bis{4-[3-(acryloyloxy) propyloxy]benzoate}, said first polymerizable monomer for crosslinking is present in said composition at a concentration of 2.8 mol % to 10 mol %,
wherein said second polymerizable monomer is selected from the group consisting of a mixture of acrylic acid 4-(4-pentyl-phenylethynyl)-phenyl ester and acrylic acid 4(4propyl-cyclohexylethynyl)-phenyl ester, 3,5-difluoro-benzoic acid 4-(5-acryloyloxy-pentyloxy)-phenyl ester, 2-methyl-acrylic acid 5-(4'-cyano-biphenyl-4-yloxy)-pentyl ester,

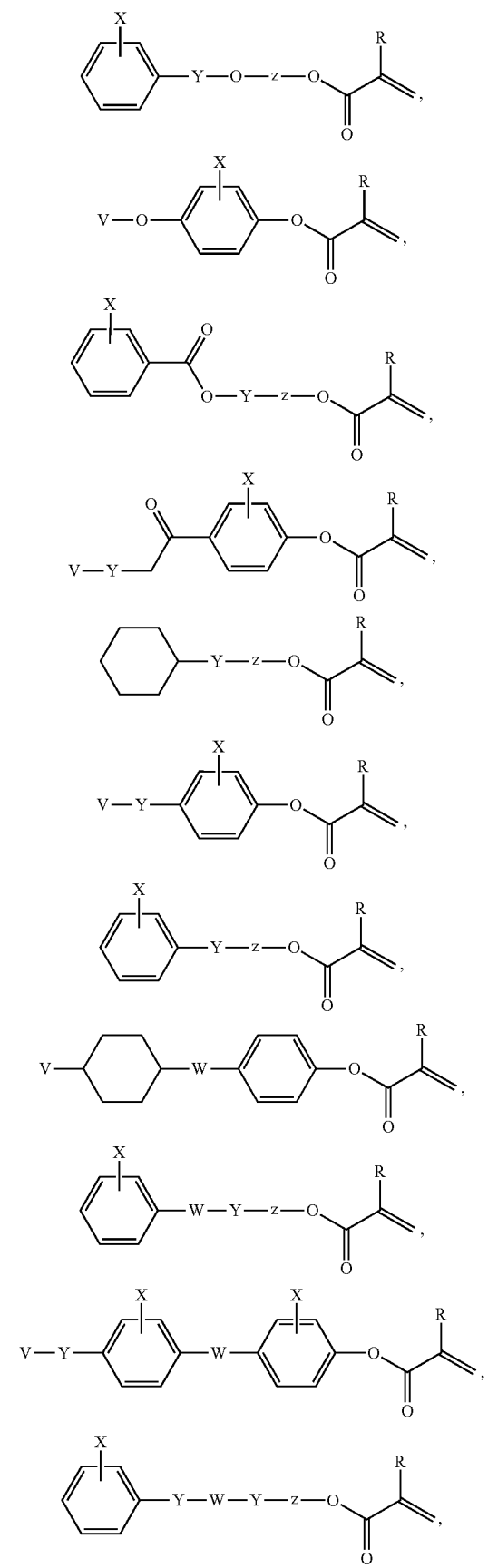

-continued

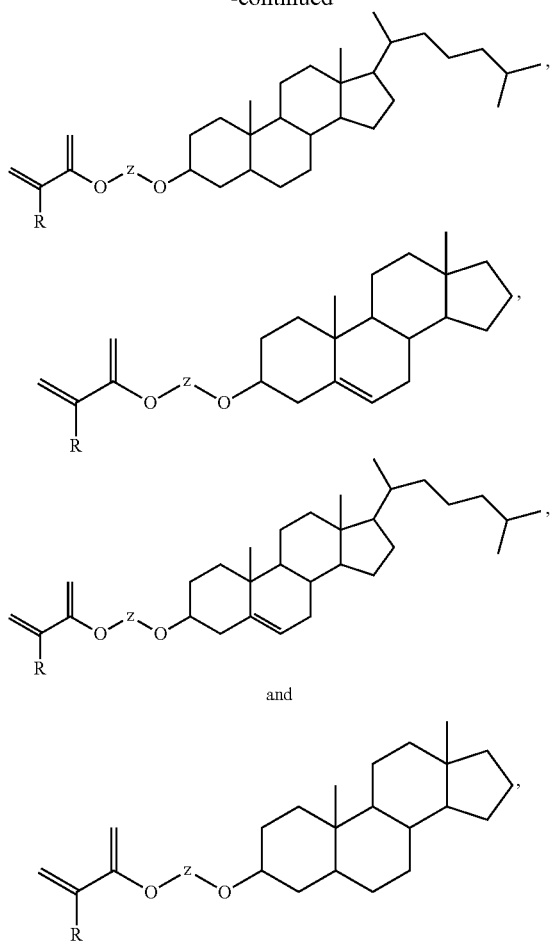

and wherein X is attached at any position of the aromatic system and is one of the following: —H, —Cl, —F, —Br, —I, —OH, —CF$_3$, —OCF$_3$, —CN, —NO$_2$, —SF$_3$, —OSF$_3$, —COOR, —OR, —SCN, —NCS, wherein Z is (CH$_2$)$_n$ where n is 0 to 22, wherein W is —C≡C—, '—RC=CR'—, O, S, NR, —COO, —OCO—, R' being C$_m$H$_{2m}$ where m is 0 to 22, R being H or C$_n$H$_{2n+1}$, where n is 0 to 22, wherein Y is one of the following: phenyl, biphenyl, triphenyl, or cyclohexyl, each of which is optionally and independently substituted by one or more of the following substituents at any position: —H, —Cl, —F, —Br, —I, —OH, —OCH$_3$—CF$_3$, —OCF$_3$, —CN, —NO$_2$, —SF$_3$, —OSF$_3$, —COOR wherein R is —(CH$_2$)$_n$CH$_3$ where n is 0 to 22, wherein V is —(CH$_2$)$_n$CH$_3$ where n is 0 to 22, and wherein R is H or C$_n$H$_{2n+1}$ where n is 0 to 22.

2. The liquid crystal composition according to claim 1, wherein said first polymerizable monomer does not have a liquid crystal side chain and said second polymerizable monomer has a liquid crystal side chain.

3. The liquid crystal composition according to claim 1, wherein, in said first and/or second polymerizable monomer, said liquid crystal side chain is directly attached to said second monomer or is attached to said second monomer via a spacer group having 1-20 C-atoms in length.

4. The liquid crystal composition according to claim 1, wherein said liquid crystal side chain has at least one polar group attached.

5. The liquid crystal composition according to claim 1, wherein said second polymerizable monomer is an acrylate monomer or a mixture of acrylate monomers.

6. The liquid crystal composition according to claim 1, wherein said liquid crystal material capable of forming a blue phase is a mixture of liquid crystalline compounds.

7. The liquid crystal composition according to claim 6, wherein said liquid crystal composition additionally comprises a photo initiator.

8. The liquid crystal composition according to claim 6, wherein said liquid crystal material capable of forming a blue phase is a mixture comprising a nematic mixture, a further liquid crystalline compound, and a chiral dopant.

9. The liquid crystal composition according to claim 1, wherein said first polymerizable monomer for crosslinking is selected from the group consisting of a diacrylate monomer and a monomer having polymerizable groups at both ends of the monomer.

10. A method of stabilising a blue phase state of a liquid crystal material capable of forming a blue phase and/or of broadening the temperature range over which a blue phase state of a liquid crystal material capable of forming a blue phase is stable, said method comprising:

mixing said liquid crystal material capable of forming a blue phase, a first polymerizable monomer for crosslinking, and a second polymerizable monomer to form the liquid crystal composition of claim 1, wherein at least one of said first and said second polymerizable monomers has a liquid crystal side chain, with the proviso that when the first polymerizable monomer is 2-methyl-1,4-phenylene bis{4-[3-(acryloyloxy) propyloxy] benzoate}, said first polymerizable monomer for crosslinking is present in said composition at a concentration of 2.8 mol % to 10 mol %, inducing polymerisation of said liquid crystal composition under conditions where a blue phase state of said liquid crystal material exists.

11. A method of lowering the operating voltage of a liquid crystal material capable of forming a blue phase, said method comprising:

mixing said liquid crystal material capable of forming a blue phase, a first polymerizable monomer for crosslinking, and a second polymerizable monomer to form the liquid crystal composition of claim 1, wherein at least one of said first and said second polymerizable monomers has a liquid crystal side chain, with the proviso that when the first polymerizable monomer is 2-methyl-1,4-phenylene bis{4-[3-(acryloyloxy) propyloxy] benzoate}, said first polymerizable monomer for crosslinking is present in said composition at a concentration of 2.8 mol % to 10 mol %, wherein said liquid crystal side chain is attached to said monomer directly or via a spacer group having 1-20 C-atoms in length, and/or wherein said liquid crystal side chain has at least one polar group attached, inducing polymerisation of said liquid crystal composition under conditions where a blue phase state of said liquid crystal material exists.

12. A blue phase liquid crystal composition stabilized by the method according to claim 10.

13. A blue phase liquid crystal composition having a stability temperature range which has been broadened by the method according to claim 10.

14. A liquid crystal cell comprising a blue phase liquid crystal composition according to claim 12.

15. A liquid crystal display comprising a blue phase liquid crystal composition according to claim 12.

16. The liquid crystal composition according to claim 1, wherein the first polymerizable monomer for crosslinking is present at a concentration of from 2.9 mol % to 5 mol %.

17. The liquid crystal composition according to claim 3, wherein at least one of the first polymerizable monomer and the second polymerizable monomer, the liquid crystal side chain is attached to the monomer via a spacer group having from 2 to 10 carbon atoms.

18. The liquid crystal composition according to claim 3, wherein at least one of the first polymerizable monomer and the second polymerizable monomer, the liquid crystal side chain is attached to the monomer via a spacer group having from 4 to 8 carbon atoms.

19. The liquid crystal composition according to claim 4, wherein the polar group attached to the liquid crystal side chain is selected from the group consisting of Cl, —F, —Br, —I, —OH, —OR, —$CF_3$, —$OCF_3$, —CN, —$NO_2$, —$SF_3$, —$OSF_3$, —COOR, —SCN, —NCS, wherein R is an alkyl chain $C_nH_{2n+1}$, wherein n=1 to 22.

20. The liquid crystal composition according to claim 1, wherein n=0 to 10.

21. The liquid crystal composition according to claim 7, wherein the photoinitiator is 2,2-dimethoxy-2-phenyl acetophenone.

22. The liquid crystal composition according to claim 8, wherein the further liquid crystalline compound is 4-cyano-4'-pentyl biphenyl.

23. The liquid crystal composition according to claim 8, wherein the chiral dopant is benzoic acid, 4-(trans-4-pentyl-cyclohexyl)-1,1'-[(1R)-1-1-phenyl-1,2-ethanediyl] ester.

24. The liquid crystal composition according to claim 9, wherein the diacrylate monomer is 2-methyl-1,4-phenylene bis{4-[3-(acryloyloxy) propyloxy] benzoate}.

25. The liquid crystal composition according to claim 9, wherein the first polymerizable monomer for crosslinking is a divinyl monomer.

26. The liquid crystal composition according to claim 10, wherein the first polymerizable monomer for crosslinking is present in the liquid crystal composition at a concentration of from 2.9 mol % to 5 mol %.

27. The liquid crystal composition according to claim 11, wherein the first polymerizable monomer for crosslinking is present in the liquid crystal composition at a concentration of from 2.9 mol % to 5 mol %.

28. The method according to claim 11, wherein the liquid crystal side chain is attached to the monomer via a spacer group having from 2 to 10 carbon atoms.

29. The method according to claim 11, wherein the liquid crystal side chain is attached to the monomer via a spacer group having from 4 to 8 carbon atoms.

30. The method according to claim 11, wherein the polar group is at least one selected from the group consisting of —Cl, —F, —Br, —I, —OH, —OR, —$CF_3$, —$OCF_3$, —CN, —$NO_2$, —$SF_3$, —$OSF_3$, —COOR, —SCN, —NCS, wherein R is an alkyl chain $C_nH_{2n+1}$, wherein n=1 to 22.

31. A liquid crystal cell comprising the blue phase liquid crystal composition of claim 13.

32. A blue phase liquid crystal composition having an operating voltage that is lowered by the method according to claim 11.

33. A liquid crystal display comprising a liquid crystal cell according to claim 14.

* * * * *